United States Patent Office 3,056,776
Patented Oct. 2, 1962

3,056,776
PROCESS FOR THE PRODUCTION OF A NEW N-HETEROCYCLIC COMPOUND
Henri Dietrich, Birsfelden, Basel Land, Switzerland, assignor to Geigy Chemical Corporation, Ardsley, N.Y., a corporation of Delaware
No Drawing. Filed Nov. 25, 1960, Ser. No. 71,434
Claims priority, application Switzerland Nov. 26, 1959
3 Claims. (Cl. 260—239)

The present invention concerns a process for the production of a new N-heterocyclic compound which is a valuable starting material for the synthesis of pharmaceuticals, 3-chloro-substituted 10,11-dihydro-5H-dibenz-[b,f]azepine of the formula

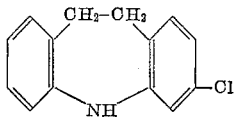

as well as the N-derivatives thereof have not been described up to now. It has now been found that this compound can be produced in a simple manner by treating 3,7 - dichloro - 10,11 - dihydro - 5H - dibenz[b,f]azepine with hydrogen and a substantially equimolar amount of an inorganic or organic base. The reaction is performed in the presence of a hydrogenation catalyst and, depending on the catalyst, at pressures of between 1 and 80 atmospheres, and at temperatures between room temperature and 100° C. Raney nickel at pressures of 10–80 atmospheres and reaction temperatures of between about 20 and 50° C., and noble metal catalysts such as, e.g. palladium, at room temperature and normal pressure, are particularly suitable as catalysts. Suitable bases are, in particular, alkali metal hydroxides and amines, especially tertiary amines such as, e.g. triethylamine. These can be added to the solution of the starting materials, for example, as solutions in methanol or ethanol. Methanol and ethanol, for example, are suitable solvents for the starting materials but the volume of solvent can be considerably reduced if, instead of these, dioxan is used, in which the starting materials are much more soluble. In addition, tetrahydrofurane, benzene and toluene for example can be used as solvents. The dehalogenation is discontinued after about one mol of hydrogen has been taken up. If there is a device enabling a sample to be taken from the autoclave, the progress of the reaction can be followed by checking the neutralisation of the base added.

The crude 3-chloro-10,11-dihydro-5H-dibenz[b,f]azepine is best purified by way of its derivatives, for example by way of the 5-acyl derivatives, but also it can be purified by a combination of repeated distillation and crystallisation.

3,7 - dichloro - 10,11 - dihydro - 5H - dibenz[b,f]-azepine can be produced from 2,2'-diamino-4,4'-dichlorodibenzyl by the process described, for example, in U.S. Patent No. 2,800,470.

The imino group of the 3-chloro-substituted 10,11-dihydro-5H-dibenz[b,f]azepine produced according to the invention can be substituted in many ways. For example, compounds having valuable anti-allergic, anticonvulsive, anti-emetic and psychotherapeutical properties such as, e.g. 5-(γ-dimethylaminopropyl)-3-chloro-10,11-dihydro-5H-dibenz[b,f]azepine, are obtained by reacting 3-chloro-10,11-dihydro-5H-dibenz[b,f]azepine in the presence of sodium amide or lithium amide with dialkylaminoalkyl halides, e.g. γ-dimethylamino-propyl halides, or with similar basic halogen compounds.

The following examples further illustrate the performance of the process according to the invention. Parts are given therein as parts by weight; their relationship to parts by volume is as that of grammes to cubic centimeters. The temperatures are in degrees centigrade. To simplify the nomenclature, the 10,11-dihydro-5H-dibenz[b,f]azepines are referred to therein as iminodibenzyls.

Example 1

56 parts of potassium hydroxide in 60 parts by volume of methanol and 75 parts of Raney nickel are added to a solution of 264 parts of 3,7-dichloro-iminodibenzyl in 600 parts by volume of dioxan, whereupon the whole is hydrogenated at 30–45° and 50 atm. H pressure until the hydrogen take-up corresponds to almost 100% (about 48 hours). The catalyst is filtered off and the filtrate is evaporated to dryness. The residue is taken up in ether, washed with water, the ether solution is dried over sodium sulphate and concentrated. The residue, which consists of a mixture of iminodibenzyl, 3-chloro-iminodibenzyl and 3,7-dichloro-iminodibenzyl is fractionally distilled in a high vacuum and the following fractions are obtained:

(1) B.P.$_{0.08}$ 128–135°;  (2) B.P.$_{0.08}$ 135–141°;
(3) B.P.$_{0.08}$ 142–154°;  (4) Residue in flask.

Fraction (1) contains iminodibenzyl in a higher percentage, this latter is isolated by crystailisation from methanol; the 3-chloro-iminodibenzyl which was mixed therewith remains in a higher percentage in the mother lye (A).

The 3,7-dichloro-iminodibenzyl present in addition to 3-chloro-iminodibenzyl in fraction (3) is isolated by crystallisation from methanol; a higher percentage of 3-chloro-iminodibenzyl remains in the mother lye (B).

Fraction (2) contains 3-chloro-iminodibenzyl impurified with iminodibenzyl. It is combined with the mother lyes (A) and (B) and again distilled in a high vacuum: (a) B.P.$_{0.09}$ 108–115°; (b) B.P.$_{0.09}$ 116–121°; (c) B.P.$_{0.09}$ 122–127°; slight residue in the flask.

Fraction (b) crystallises from benzine or petroleum ether. Repeated recrystallisation from benzine produces pure 3-chloro-iminodibenzyl which melts at 87–89°.

Example 2

5 parts of palladium distributed in charcoal are added to a solution of 52.8 parts of 3,7-dichloro-iminodibenzyl and 20.2 parts of triethylamine in 500 parts by volume of ethanol and the whole is hydrogenated at room temperature and normal pressure until no more hydrogen is taken up (after 3 hours the H$_2$ take-up is 97% of the theoretical). After filtering off the catalyst and evaporating the filtrate, the residue is worked up as described in Example 1 and crystallised 3-chloro-iminodibenzyl is obtained.

Example 3

(a) 3,7-dichloro-iminodibenzyl is hydrogenated as described in Example 1 or 2 and the hydrogenation product is worked up as described in Example 1. The first fraction obtained by distillation in a high vacuum (corresponding to fraction 2 in Example 1), in which the major part of the 3-chloro-iminodibenzyl formed is dissolved in acetyl chloride and acetylated for 2 hours under reflux. After evaporating off the acetyl chloride and washing the evaporation residue until it is neutral, the residue is fractionally crystallised from ether-petroleum ether or from ether-methanol, whereby 5-acetyl-3-chloro-iminodibenzyl (M.P. 126°) is separated from the 5-acetyl-iminodibenzyl (M.P. 90°) which is also present.

(b) The same number of parts of 5-acetyl-3-chloro-iminodibenzyl and potassium hydroxide in 10 parts by volume of ethylene glycol are refluxed for 4 hours, then 1 part by volume of water is added, the whole is boiled for an hour, cooled, then diluted with 50 parts by volume of water and extracted with ether. The ethereal solution is washed until it is neutral, dried over sodium sulphate and evaporated to dryness. After crystallising the residue from benzine, 3-chloro-iminodibenzyl is obtained.

What I claim is:

1. A process for the production of 3-chloro-10,11-dihydro-5H-dibenz[b,f]azepine of the formula

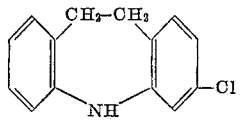

which comprises subjecting 3,7-dichloro-10,11-dihydro-5H-dibenz[b,f]azepine to the action of catalytically activated hydrogen in the presence of a substantially equimolar amount of a base selected from the group consisting of alkali metal hydroxides and tertiary amines, and discontinuing the action of hydrogen as soon as about one mole thereof has been taken up, whereby one of the chlorine atoms of said 3,7-dichloro compound is selectively eliminated.

2. A process for the production of 3-chloro-10,11-dihydro-5H-dibenz[b,f]azepine of the formula

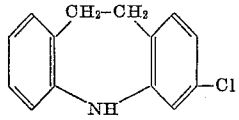

which comprises subjecting 3,7-dichloro-10,11-dihydro-5H-dibenz[b,f]azepine to the action of hydrogen under superatmospheric pressure in the presence of Raney nickel and of a substantially equimolar amount of alkali metal hydroxide, and discontinuing the action of hydrogen as soon as about one mole thereof has been taken up, whereby one of the chlorine atoms of said 3,7-dichloro compound is selectively eliminated.

3. A process for the production of 3-chloro-10,11-dihydro-5H-dibenz[b,f]azepine of the formula

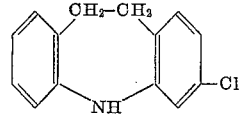

which comprises subjecting 3,7-dichloro-10,11-dihydro-5H-dibenz[b,f]azepine to the action of hydrogen at room temperature and normal pressure in the presence of palladium catalyst and of a substantially equimolar amount of tertiary amine, and discontinuing the action of hydrogen as soon as about one mole thereof has been taken up, whereby one of the chlorine atoms of said 3,7-dichloro compound is selectively eliminated.

References Cited in the file of this patent

Ellis: Hydrogenation of Organic Substances, Third Edition (1930), pages 301–305.

Tsutsumi et al.: Jour. Chem. Soc., Japan, Ind. Chem. Sect., 55:105–7 (1952).